United States Patent
Buermann

(10) Patent No.: US 11,746,921 B2
(45) Date of Patent: *Sep. 5, 2023

(54) VALVE COVER

(71) Applicant: Hyperkinetics Corporation, Williamstown, VT (US)

(72) Inventor: Henry Buermann, Brookfield, VT (US)

(73) Assignee: HYPERKINETICS CORPORATION, Williamstown, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,624

(22) Filed: May 26, 2022

(65) Prior Publication Data

US 2022/0364655 A1    Nov. 17, 2022

Related U.S. Application Data

(63) Continuation of application No. 17/158,468, filed on Jan. 26, 2021, now abandoned, which is a (Continued)

(51) Int. Cl.
*F16K 27/12* (2006.01)
*F17C 13/06* (2006.01)
(Continued)

(52) U.S. Cl.
CPC .............. *F16K 27/12* (2013.01); *B65D 41/32* (2013.01); *F16K 35/10* (2013.01); *F17C 13/06* (2013.01);
(Continued)

(58) Field of Classification Search
CPC ... Y10T 137/7062; F16K 35/00; F16K 35/10; F16K 27/12; F17C 13/06;
(Continued)

(56) References Cited

U.S. PATENT DOCUMENTS 3,125,242 A    3/1964   Davis
3,204,805 A    9/1965   May
(Continued)

FOREIGN PATENT DOCUMENTS

CA    2919610 A1   9/2015
EP    3114076 A4   11/2017
(Continued)

OTHER PUBLICATIONS

Abstract of FR2636309, Mar. 16, 1990, eight pages.
(Continued)

*Primary Examiner* — Kevin F Murphy
*Assistant Examiner* — Jonathan J Waddy
(74) *Attorney, Agent, or Firm* — Bradley Arant Boult Cummings, LLP; Blake M. Bernard

(57) ABSTRACT

The presently-disclosed subject matter includes valve covers. The valve covers can protect valves from exposure as well as from tampering. In some embodiments the valve cover comprises a cap that includes a top end and a side wall that is substantially cylindrical. Embodiments of valve covers also include a plug on an interior side of the top end of the cap that projects toward the opening of the cap. When the valve cover is installed, the plug can extend beyond an opening of the valve.

12 Claims, 4 Drawing Sheets

Related U.S. Application Data continuation of application No. 16/186,563, filed on Nov. 11, 2018, now Pat. No. 10,900,584, which is a continuation of application No. 14/991,766, filed on Jan. 8, 2016, now Pat. No. 10,145,484, which is a continuation of application No. PCT/US2014/021373, filed on Mar. 6, 2014.

(51) Int. Cl.
 *B65D 41/32* (2006.01)
 *F16K 35/10* (2006.01)

(52) U.S. Cl.
 CPC . *F17C 2205/0308* (2013.01); *Y10T 137/7062* (2015.04)

(58) Field of Classification Search
 CPC ..... F17C 2205/0308; F17C 2205/0311; B65D 17/163; B65D 17/168; B65D 17/20; B65D 17/24; B65D 41/32; B65D 43/0256; B65D 43/0249
 USPC ........ 137/382; 220/724, 915, 265, 266, 270, 220/581, 282, 203.07, 203.29, 367.1; 215/250, 253, 254; 206/6; D9/416, 518, D9/901, 902
 See application file for complete search history.

(56) References Cited

U.S. PATENT DOCUMENTS

| | | | |
|---|---|---|---|
| 3,211,323 A | 10/1965 | Foster |
| D263,563 S | 3/1982 | Ito |
| 4,616,763 A | 10/1986 | Ruhl |
| 4,651,771 A | 3/1987 | Borenstein et al. |
| 4,712,705 A | 12/1987 | Fuehrer |
| 4,729,488 A | 3/1988 | Bullock, III |
| 4,787,530 A | 11/1988 | Edwards |
| 4,807,660 A | 2/1989 | Aslanian |
| 4,934,554 A | 6/1990 | Edwards |
| D311,868 S | 11/1990 | Armstrong |
| 5,104,379 A | 4/1992 | Nakamura et al. |
| D327,849 S | 7/1992 | Armstrong |
| 5,145,065 A | 9/1992 | Mizutani et al. |
| 5,538,154 A | 7/1996 | Von Holdt |
| 5,564,584 A | 10/1996 | Raboin et al. |
| 5,653,256 A | 8/1997 | Myers et al. |
| 6,003,714 A | 12/1999 | Buermann |
| 6,196,408 B1 | 3/2001 | Setty et al. |
| 6,341,707 B1 | 1/2002 | Witt et al. |
| 6,854,616 B2 | 2/2005 | Steffan |
| 6,899,245 B1 | 5/2005 | Nelson |
| 7,152,760 B1 | 12/2006 | Peabody |
| 7,207,457 B2 | 4/2007 | Schwarz |
| D612,013 S | 3/2010 | Buermann |
| 7,690,525 B2 | 4/2010 | Schutz et al. |
| 7,766,178 B2 | 8/2010 | Robinson et al. |
| 7,770,601 B2 | 8/2010 | Perry |
| D642,467 S | 8/2011 | Knutson |
| 8,777,032 B2 | 7/2014 | Biesecker et al. |
| D739,500 S | 9/2015 | Buermann |
| 10,145,484 B2 | 12/2018 | Buermann |
| 10,900,584 B2 | 1/2021 | Buermann |
| 2003/0201266 A1 | 10/2003 | Steffan |
| 2005/0274724 A1 | 12/2005 | Goggin |
| 2008/0007011 A1 | 1/2008 | Buermann |
| 2008/0066809 A1 | 3/2008 | Zeyfang |
| 2008/0232927 A1 | 9/2008 | Trimble et al. |
| 2009/0223967 A1 | 9/2009 | Mengeu et al. |
| 2011/0114644 A1 | 5/2011 | Willey |
| 2011/0127232 A1 | 6/2011 | Willows et al. |
| 2011/0210134 A1 | 9/2011 | Zeyfang et al. |
| 2011/0278316 A1 | 11/2011 | Herzer et al. |
| 2014/0166659 A1 | 6/2014 | Antal, Sr. et al. |
| 2014/0263326 A1 | 9/2014 | Antal, Sr. et al. |
| 2014/0263356 A1 | 9/2014 | Antal, Sr. et al. |

FOREIGN PATENT DOCUMENTS

| | | |
|---|---|---|
| FR | 2134252 A1 | 12/1972 |
| FR | 2636309 A1 | 3/1990 |
| GB | 2097768 A | 11/1982 |

OTHER PUBLICATIONS

Canadian Office Action dated Jun. 9, 2016, in related Canadian Application No. 2,919,610, four pages.

Canadian Office Action dated Mar. 8, 2016, in related Canadian Application No. 2,919,610, five pages.

Canadian Office Action for Application No. 2919610, dated Apr. 3, 2017, four pages.

EM 002647404-0001, Valve Cover, Hyperkinetics Corporation, Certificate of Registration, Issued Mar. 20, 2015, six pages.

EP14884592, Supplementary European Search Report, dated Oct. 20, 2017, seven pages.

PCT App. No. PCT/US2014/021373 International Search Report and Written Opinion, dated Jun. 20, 2014, eight pages.

VALVE COVER

CROSS-REFERENCES TO RELATED APPLICATIONS

This application is a continuation of U.S. patent application Ser. No. 17/158,468 filed Jan. 26, 2021 entitled "VALVE COVER," which is a continuation of U.S. patent application Ser. No. 16/186,563 filed Nov. 11, 2018 entitled "VALVE COVER", which is a continuation of U.S. patent application Ser. No. 14/991,766 filed Jan. 8, 2016 entitled "Valve Cover" (now U.S. Pat. No. 10,145,484), which is a continuation of PCT Application No. PCT/US2014/021373 filed Mar. 6, 2014 entitled "Valve Cover", each of which is hereby incorporated by reference in their entireties.

TECHNICAL FIELD

The presently-disclosed subject matter generally relates to a cover for valves. More particularly, the presently-disclosed subject matter relates to valve covers that include a cap that covers the valve and a plug for the valve opening.

BACKGROUND OF THE INVENTION

Compressed and/or liquefied gasses are commonly stored in metal containers or tanks, which are commonly referred to as cylinders. To dispense the gas, a valve is provided on the containers. The valves are coupled to the containers and comprise a valve opening from which gas can be released. Valves also include a mechanism for opening and closing the valve, such as a handle or wheel that can be activated.

Gasses can be stored under relatively high pressure, can be flammable and/or toxic, and can be harmful to animals and the environment. Gasses may also be relatively expensive or may need to be stored for extended periods of time. Thus, a valve should open only when the opening mechanism is activated. In addition, since these gases under pressure can be toxic, flammable, and/or expensive, the connection between the container and any utilization equipment should be "leak free" or "leak tight," meaning there are no leaks that allow excess amounts of the compressed gas to unintentionally escape and create an unsafe condition.

In this regard, certain valves can become damaged and malfunction if the valve opening is exposed. Moisture, dirt, insect nests (e.g., wasps), and other obstructions can enter the valve opening during storage or transport, and can potentially interfere with the valve's opening and closing mechanisms and cause gas to unintentionally release. Obstructions that enter the valve can also damage the threads, sealing surfaces, or other features located on an interior side of the valve, which can make it difficult or impossible to establish a leak free seal. Accordingly, anything that gets into the valve, or damages it in any way, can compromise the seal between the utilization equipment and the valve, potentially making it unsafe to store, transport, or use the compressed gas.

Several known covers have been created to attempt to protect a valve from tampering and/or exposure. For example, U.S. Pat. No. 6,854,616 to Daniel J. Steffan and U.S. Patent Application Publication No. 2008/0232927 to Trimble et al., which are hereby incorporated by reference, describe protective caps for threaded valve stems. However, these known protective caps only cover the exterior of a valve and offer limited protection for the opening of a valve.

Accordingly, there remains a need for a valve cover that can better protect a valve from exposure or damage. There also remains a need for such valve cover that also comprise tamper evident characteristics.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by one of ordinary skill in the art, definitions may be set forth to facilitate explanation of the presently-disclosed subject matter.

Following long-standing patent law convention, the terms "a", "an", and "the" refer to "one or more" when used in this application, including the claims. Thus, for example, reference to "a vent" includes a plurality of such vents, and so forth. Unless otherwise indicated, all numbers expressing quantities, measurements, and so forth used in the specification and claims are to be understood as being modified in all instances by the term "about".

The presently disclosed subject matter includes a valve cover that can overcome the above-described limitations and disadvantages. Some embodiments provide a valve cover that comprises a cap and a plug, wherein the plug is on an interior side of the top end of the cap and projects toward the opening of the cap. In this manner, when the valve cover is installed on a valve, the plug can provide additional protection to the opening and/or the interior side of the valve from exposure, tampering, or both. In some embodiments the plug includes a diameter that is less than a diameter of the valve opening. In certain embodiments, when the valve cover is installed on a valve, the plug extends at least partially beyond the opening of the valve.

Figure 7:
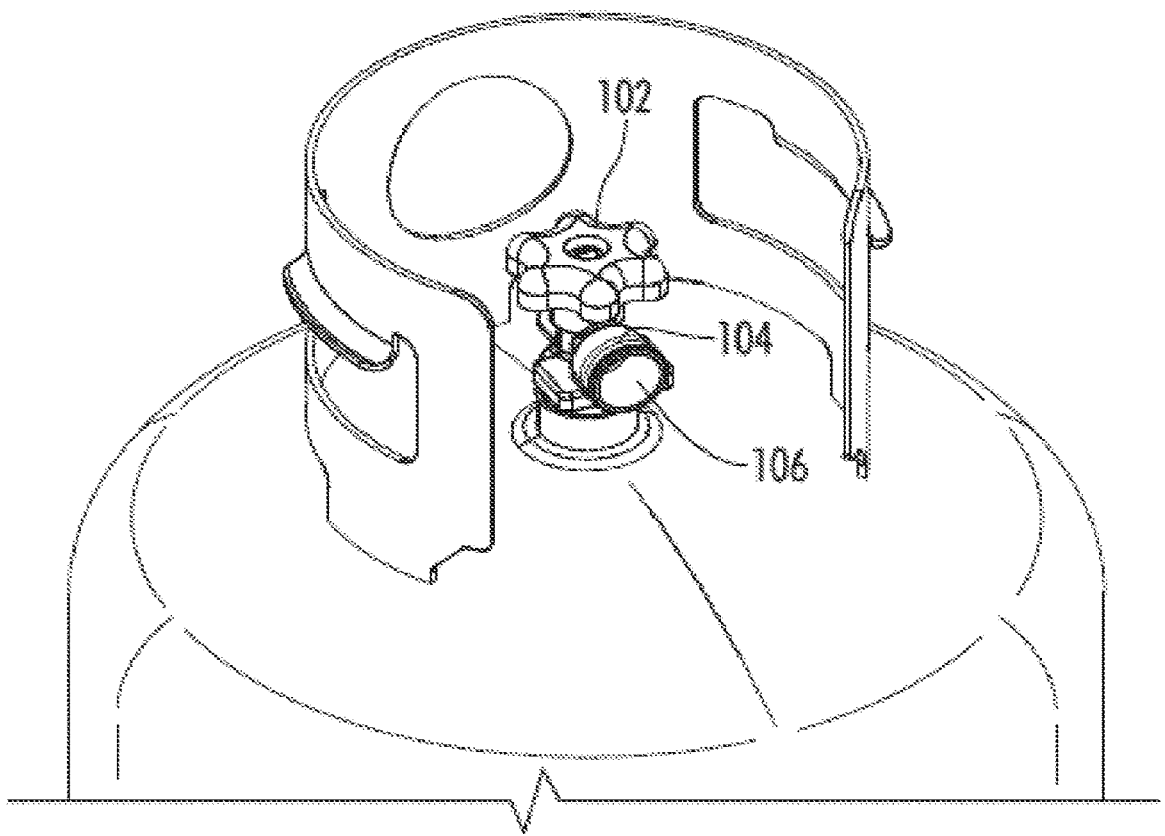
FIG. 7 shows a perspective view of a valve installed on a compressed gas container.

In this regard, FIG. 7 shows an exemplary valve that the present valve cover can be installed on. The valve includes a handle (i.e., a hand wheel) 102 for opening and closing the valve. Gas can be loaded into or released out of a container through a valve opening 106. The gas to be used in conjunction with the valve is not particularly limited. In some embodiments the valve is intended for use with a propane gas container. Valves may or may not further comprise a threaded lip portion 104 that surrounds an exterior side of the opening. Threaded lip portions 104 can be used to secure hoses or devices to the valve, particularly when filling a container. As discussed below, in some embodiments the threaded lip portion 104 can be used to install and secure a valve cover to a valve.

Figure 8:
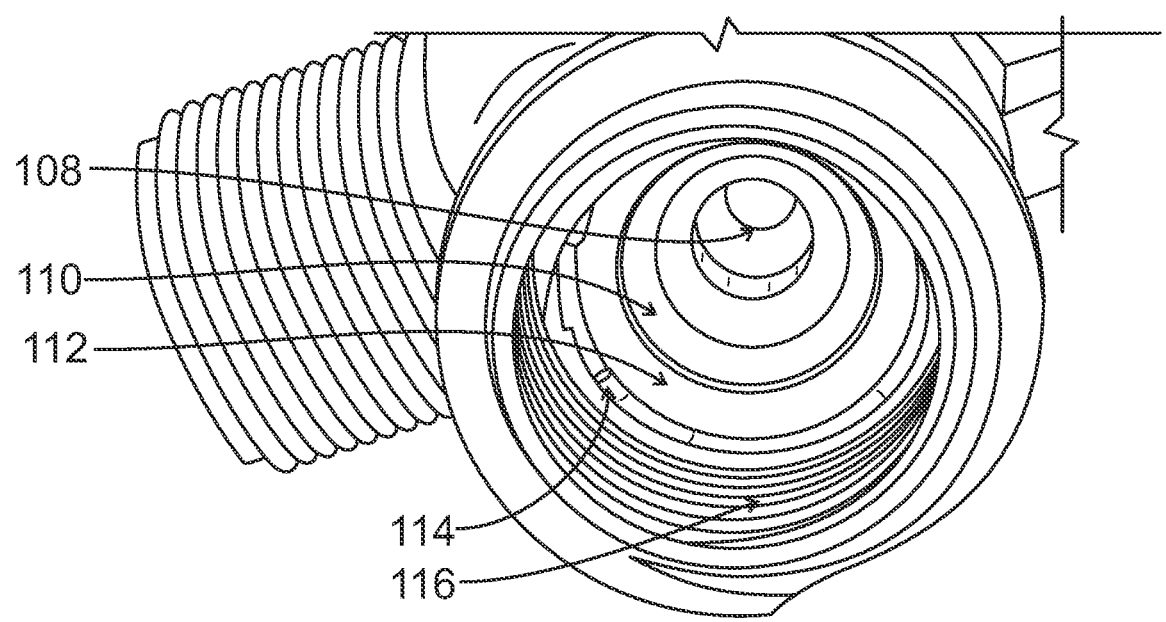
FIG. 8 shows an interior view of a valve.

FIG. 8 shows an interior view of the exemplary valve. While the opening of the valve 106 is defined by its outer edge, the interior side of the valve includes a valve orifice 108 that can be opened and closed, and that can serve as an inlet or outlet for gas. FIG. 8 also shows that an interior side of the valve can comprise an o-ring 110 that is positioned next to the orifice 108, a sealing surface 112, a snap ring 114, and an interior threaded portion 116 that can individually or collectively be used to form a seal between the valve and any utilization equipment. Any of these interior components can be protected to ensure that a valve can form an adequate seal. For example, The o-ring 110 can be a rubber o-ring, and can be damaged by obstructions or other contaminants. Similarly, the sealing surface 112 and interior threaded portion 116 can be damaged, possibly beyond repair, by obstructions or other contaminants such that it becomes difficult or impossible to establish an adequate seal between a valve and utilization equipment. Furthermore, in some embodiments the snap ring 114 covers only a portion of the interior circumference of a valve, and contaminants can become lodged in the snap ring 114 or at a portion of the valve that is not covered by the snap ring 114.

Figure 1:
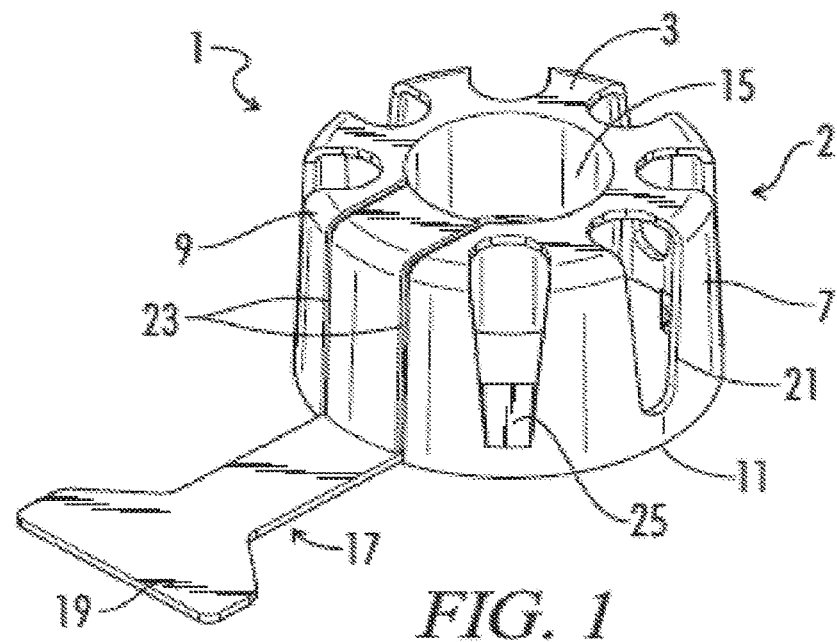
FIG. 1 shows a perspective view of an embodiment of a valve cover in accordance with the presently disclosed subject matter.

Looking now to FIG. 1, there is shown a perspective view of an embodiment of a valve cover 1 in accordance with the presently-disclosed subject matter. The valve cover 1 includes a cap 2 that can cover the opening of a valve 106. The cap 2 includes a top end 3 and a side wall 7. The side wall 7 shown in FIG. 1 is substantially cylindrical, but the shape of the side wall 7 can vary, and can depend on the shape of the valve to be covered. The side wall 7 includes a top edge 9 that joins a perimeter of the top end 3. The side wall 7 also includes a bottom edge 11 that defines an opening 5 of the cap 2. In this regard, when describing the orientation of a valve cover herein, a top side and a bottom side refer to, respectively, an upper side and a lower side from the perspective shown in FIG. 1.

The top end 3 and side wall 7 together comprise a cap 2 that can be used to cover and protect a valve. The height of the side wall 7 (i.e., top edge 9 to bottom edge 11) is not particularly limited. In some embodiments the height of a side wall 7 depends on the type of valve to be covered. In some embodiments the height of the sidewall 7 is about 0.25 to about 2 times the diameter of the top end 3 of the cap 2. In some embodiments the side wall 7 is tall enough that, when installed, the valve cover 1 protects at least a portion of a threaded lip portion 104 of a valve.

FIG. 1 also shows that the valve cover 1 includes a plurality of vents 21 that extend in a longitudinal direction (i.e., centerline of valve cover) along the side wall 7 of the cap 2. The plurality of vents 21 also extend along a portion of the top end 3 of the cap 2. Although vents 21 are optional in some embodiments, vents 21 can serve various purposes. Vents 21 can decrease the amount of material required to manufacture a valve cover 1, thereby lowering the material costs to manufacture a valve cover 1. Vents 21 can also provide an opening for one to inspect a valve's threaded portion 104 (or equivalent nonthreaded portion) without having to remove the valve cover 1. The dimensions and number of vents 21 provided on a valve cover can vary for different embodiments of valve covers and for different applications.

Further still, FIG. 1 shows that the valve cover 1 can further comprise a pair of tear strips 23. The pair of tear strips 23 are substantially parallel, and extend across the side wall 7 from the bottom edge 11 to the top edge 9, and also extend across a portion of the top end 3 from the perimeter of the top end 3 towards a center thereof. In other embodiments, the tear strips 23 extend along at least a portion of the side walls 7, but do not extend across the top end 3 of the cap 2. In even further embodiments, the tear strips 23 only extend across a portion of the sidewall, and, for example, only extend from the opening 5 of the valve cover 1 to a midway point along the width of the sidewall 7. The tear strips 23 in FIG. 1 are grooves formed in the side wall 7, which can be split so that the side wall 7 opens along its width. The tear strips 23 can be any design that can be split, such as a groove that is V-shaped or U-shaped, a perforated strip, or the like.

Located between the pair of tear strips 23, and projecting from the cap 2, is a pull tab 17. Thus, the pull tab 17 is coupled to a portion of the side wall 7 that is between the pair of tear strips 23. As shown in FIG. 1, the pull tab 17 extends from the bottom edge 11 of the portion of the side wall 7 that is located between the pair of tear strips 23. FIG. 1 also shows that the pull tab 17 is perpendicular to the surface of the side wall 7. In other embodiments the pull tab 17 is angled relative to a surface of the wide wall 7. In specific embodiments the pull tab 17 is angled in an upward direction, and in other specific embodiments the pull tab 17 is angled in a downward direction.

To remove the exemplary valve cover 1 from a valve, one can pull on the pull tab 17 with a force sufficient to at least partially split one or both of the tear strips 23. With the tear strip(s) 23 split, the side wall's 7 effective diameter can increase such that it can release from the valve. The pull tab 17 need not be between a pair of tear strips 23. In some embodiments a valve cover comprises only one tear strip 23, and the pull tab 17 can be provided on or near the tear strip 23 such that when force is applied to the pull tab 17 the tear strip 23 splits and permits release of the valve cover 1 from a valve.

The pull tab 17 can optionally be provided with a pull tab handle 19. The pull tab handle 19 can be a relatively wider portion of the pull tab 17, and thus can be easier to grab. The pull tab handle 19 can also be provided with or without texturing, ribs, grooves, or other features that can enhance the grip of the pull tab handle 19.

In some embodiments, the valve covers 1 are not provided with tear strips 23 and/or pull tabs 17.

Figure 2:
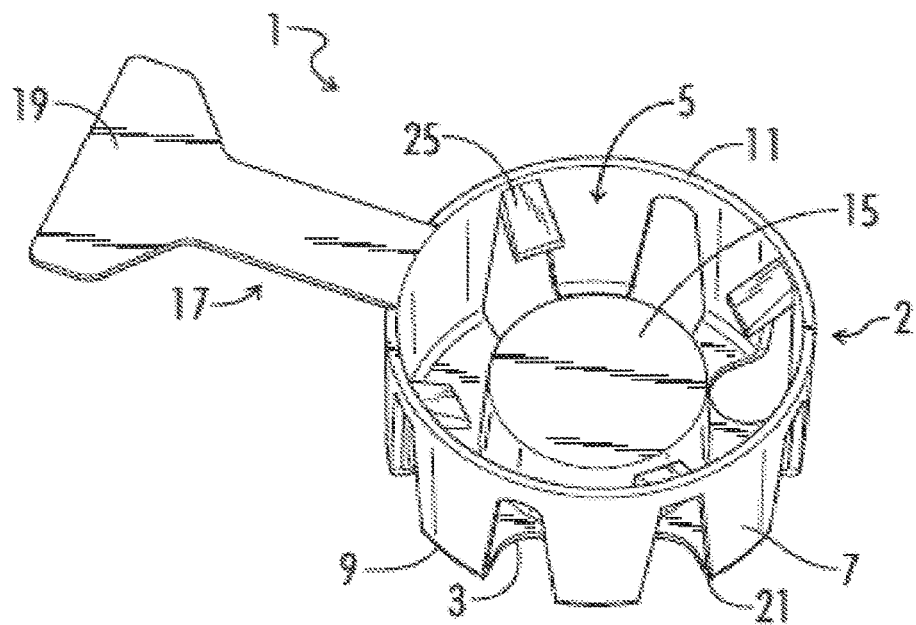
FIG. 2 shows another perspective view of the embodiment of the valve cover.
Figure 3:
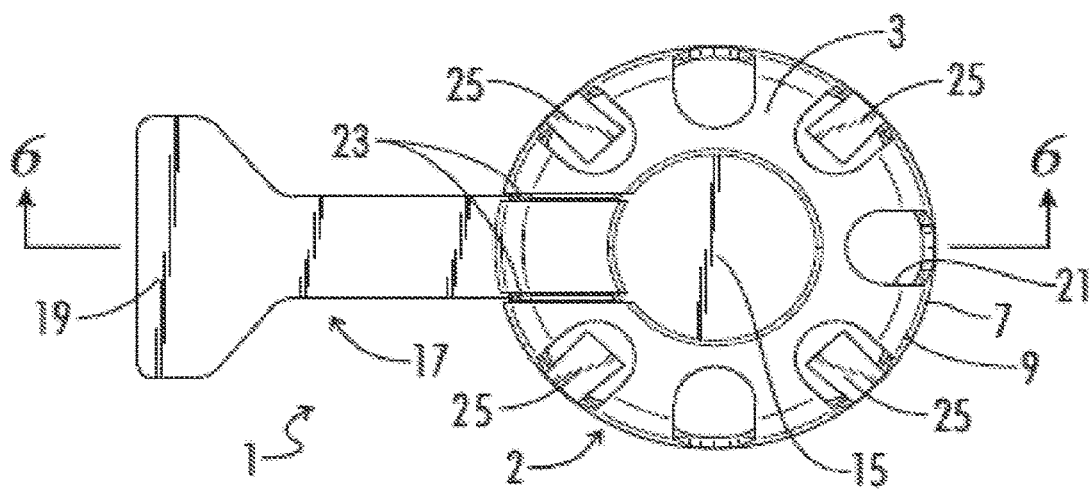
FIG. 3 shows a top view of the embodiment of the valve cover.
Figure 4:
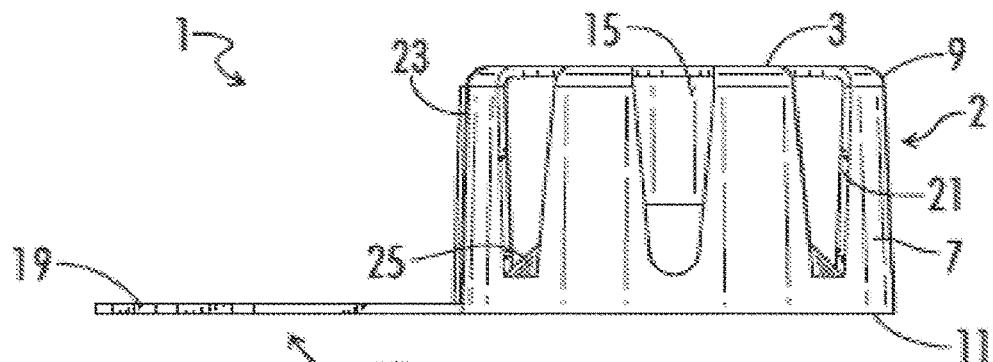
FIG. 4 shows a side front view of the embodiment of the valve cover.
Figure 5:
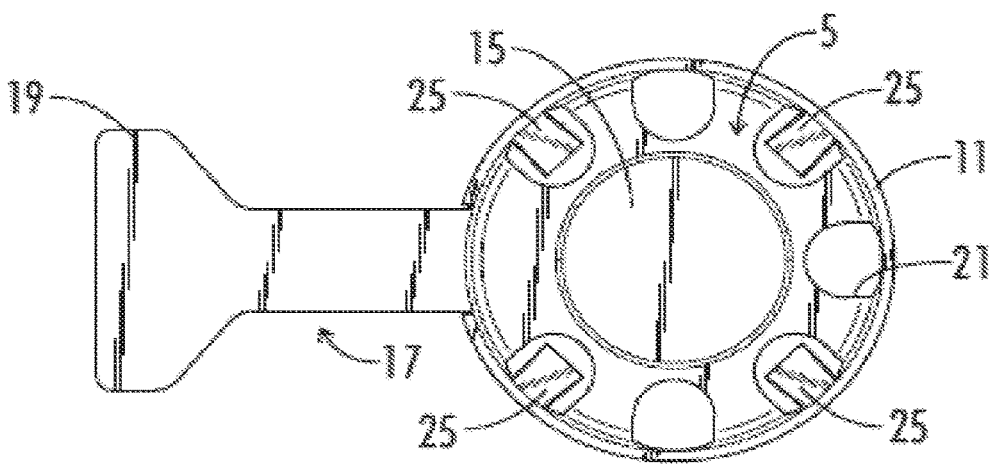
FIG. 5 shows a bottom view of the embodiment of the valve cover.
Figure 6:
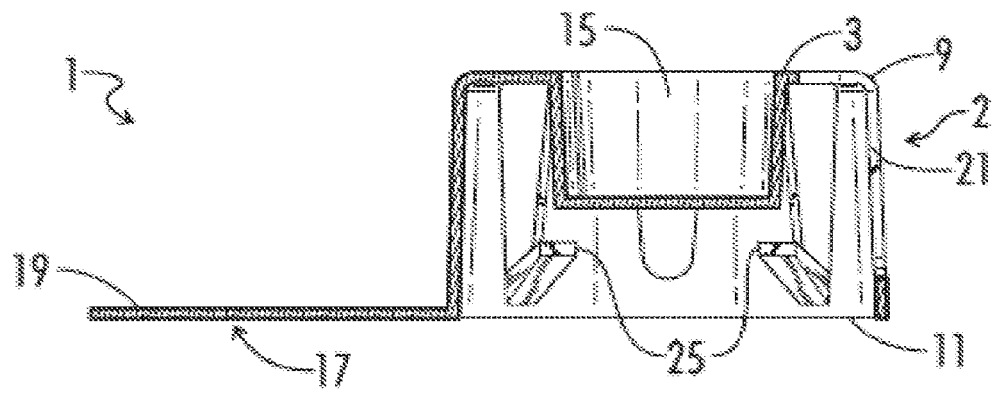
FIG. 6 shows a cross-sectional view of the embodiment of the valve cover.

Looking now to FIG. 2, another perspective view is shown that illustrates the bottom side of the valve cover 1. FIG. 2 shows that the valve cover 1 includes a plug 15 located on the top end 3 of the cap 2 that projects toward the opening 5 of the cap 2. The depicted plug 15 is substantially cylindrical, although in different embodiments plugs can be of any shape that corresponds to the shape of the opening on a valve. The depicted plug 15 also comprises a flat distal end, although the plug can have differently shaped distal ends. For instance, plugs 15 may have a pointed or rounded distal end in some embodiments, and may comprise recessed ends in other embodiments.

The plug 15 shown in FIG. 2 comprises a height (i.e., length from top end of cap 2 to the bottom end of the plug 15) such that, when the valve cover 1 is installed on a valve, the plug 15 at least partially enters the opening on the valve.

More specifically, when installed, the plug can at least partially extend beyond a threshold defined by the opening edge of a valve. In some embodiments, when the valve cover is installed, the opening edge of the valve contacts the inner side of the top end 3 of the valve cover 1, and therefore the entire plug 15 is located within an interior side of the valve (i.e., beyond the valve opening). In other embodiments, when the valve cover 1 is installed only a portion of the plug 15 extends into a valve's opening.

In some embodiments the plug 15 includes a diameter that is less than a diameter of the valve opening, and therefore the plug 15 can enter an opening on a valve with little to no resistance. In other embodiments the plug 15 can have a diameter equal to or greater than a diameter of an opening on a valve, such that the plug 15 must compress and/or scrape off a surface thereof in order to enter a valve opening. In this regard, a plug 15 is said to enter a valve opening when it extends past a threshold defined by the opening on the valve.

Additionally, the dimensions of a plug 15 can vary depending on the valve to be covered. In some embodiments the height of the plug 15 is defined in terms of the height of the sidewall 7, or a length between a top edge 9 and bottom edge 11 of the sidewall 7. In some embodiments the plug 15 extends about 5% to about 95%, about 25% to about 75%, and/or about 35% to about 60% of the distance between the top edge 9 and the bottom edge 11 of the sidewall 7. In specific embodiments the plug 15 extends about 10%, about 20%, about 30%, about 40%, about 50%, about 60%, about 70%, about 80%, or about 90% of the distance between the top edge 9 and the bottom edge 11 of the sidewall 7. In some embodiments the plug includes a height that allows the distal end of the plug to be recessed with respect to a plane defined by the bottom edge of the side wall.

In some embodiments a plug 15 can enhance the ability of the valve cover 1 to protect a valve, and particularly a valve opening, from exposure and/or tampering. The present valve covers can protect outer portions of a valve, and can even protect a threaded portion 104 that is around a periphery of a valve opening 106. Furthermore, unlike known valve covers that only protect an valve's exterior, the present valve covers can protect the opening or the interior side of a valve.

As discussed above, the interior side of certain valves can comprise an interior threaded portion 116 for attaching regulators and other utilization equipment. Valves can also comprise a machined sealing surface 112 that is configured to seal with the nipple on a regulator or hose connection. However, if the sealing surface 112 gets scratched, pitted, or damaged, which can occur if debris is in the valve when a regulator or other device is attached, the valve's ability to seal can be compromised. In some instances the valve becomes unsafe to use, and in some instances the damage cannot be repaired. Therefore, to ensure that valves are in good working order and can form a satisfactory seal, the plugs 15 can provide protection to the interior threaded portion 116 and/or sealing surface 112 from exposure and tampering. The interior portion of valves may also comprise an o-ring 110 and/or snap ring 114, both of which can be protected by certain embodiments of the present valve covers 1.

In this regard, the opening of a valve can also become obstructed to the point that a regulator or hose can no longer be connected to the valve. For example, insect nests, dirt, sand, snow, ice, and the like can enter a valve opening and make it difficult or impossible to seal the regulator or hose to the valve. The plugs 15 of the present valve covers can fill and protect the interior side of a valve from such obstructions.

Plugs 15 can also provide additional protection to valves covers that comprise vents 21, since the vents 21 in some valve covers can otherwise permit contaminants to enter a valve opening or provide easier access for one to tamper with a valve when compared to valves covers 1 that do not comprise vents 21.

FIG. 2 also shows that the embodied valve cover 1 comprises a plurality of protrusions 25 that extend from an inner side of the side wall 7. The protrusions 25 generally extend toward the top end 3 of the cap 2. Thus, when the valve cover 1 is installed to cover a valve, the protrusions 25 can help hold the valve cover 1 on the valve.

In some embodiments a valve cover will be frictionally held on to a valve once it is installed. In some embodiments of valves covers 1 that include protrusions 25, the protrusions 25 can frictionally hold an installed valve cover on a valve. In some embodiments the protrusions 25 provide a mechanism by which the valve cover 1 can lock on to the valve, and removal of the valve cover 1 can be easily accomplished only by compromising the valve cover 1. For example, should a particular valve have a threaded portion 104, the protrusions 25 can extend between the threads to lock the valve cover on to the valve. Furthermore, embodiments of protrusions 25 that extend toward the top end 3 of the cap 2, rather than towards the opening 5, can provide additional locking force once the valve cover is installed on a valve.

The specific shape, size, and angle of protrusions 25 can vary depending on, among other things, the valve to be covered. In some embodiments the protrusions 25 extend toward the opening 5 of a valve cover 1 in an installed and/or uninstalled state. In some embodiments the protrusions 25 extend toward a top end 3 of the valve cover 1 in an installed and/or uninstalled state. In some embodiments protrusions 25 can extend perpendicular to a surface of the side wall 7 in an installed and/or uninstalled state.

Protrusions 25 can also be manufactured to comprise a certain degree of flexibility such that the protrusions 25 can bend to permit installation of a valve cover 1 on a valve. In some embodiments, flexible protrusions 25 have a spring-like action so that once the protrusions 25 bend to permit installation of a valve cover 1 on a valve, the protrusions can flex back towards their original orientation to lock the valve cover 1 on a valve. It will be understood that the term "lock" is used herein to refer to any degree to which a valve cover is held on to a valve, and does not necessarily imply an absolute lock. Some valve covers can lock on to a valve in such a way that they can only be uninstalled by breaking (i.e., compromising) the valve cover.

Accordingly, in some embodiments a valve cover 1 that has been installed on a valve can be removed only by compromising the valve cover 1. More specifically, in some embodiments, once the valve cover 1 is installed and locked on to a valve, it can be reasonably removed only by breaking the tear strip(s) 23. Once the tear strip(s) 23 are broken, the effective diameter of the side wall 7 is increased so that the frictional force and/or protrusions holding the valve cover 1 to the valve can be reduced or eliminated. Furthermore, for embodiments that have a locking mechanism to hold a valve cover on to a valve (e.g., protrusions), breaking the side wall 7 can allow one to peal peel the valve cover 1 off of the valve.

Breaking the tear strip 23 or another portion of the valve cover 1 in order to uninstall a valve cover will indicate that a particular valve has potentially been accessed or used. A broken valve cover can indicate that gas has been released from a container. A broken valve cover may also alert a user that the valve has been exposed, possibly during storage, transport, or both. A broken valve cover may also indicate that a valve has been tampered with. Thus, assuming valves are covered after a container is filled with a gas, valve covers can function as indicators of whether a particular container has been used since last being filled.

In this regard, when full containers and empty containers are stored in close proximity to one another the valve cover can be used to differentiate between full containers, which would have a valve cover installed, and used/empty containers, which would not have a cover installed. Mix-ups can occur as a result of someone removing a valve cover from a full container, using the compressed gas, and then installing the newly removed valve cover on the valve outlet of the empty container. In this situation, one can accidentally take the empty container with a valve cover believing it is a full container. Thus, some embodiments of valve covers are destroyed or rendered unusable during the initial removal process to prevent them from being reused or placed back on the valve outlets of empty containers. This characteristic is referred to as a "tamper evident" seal herein.

The presently-disclosed subject matter also includes methods for making and using the present valve covers 1. The valve covers 1 can be made of any suitable material or combination of materials. In some embodiments the valve covers 1 comprise a thermoplastic resin. In some embodiments the valve covers 1 are made via injection molding or 3D printing. Valve covers 1 can also include metal, resins, or other suitable materials.

LIST OF NUMBERED ELEMENTS

1—valve cover
2—cap
3—top end
5—opening
7—side wall
9—top edge
11—bottom edge
15—plug
17—pull tab
19—pull tab handle
21—vent
23—tear strip
25—protrusion
102—handle
104—threaded portion
106—valve opening
108—valve orifice
110—o-ring
112—sealing surface
114—snap ring
116—interior threaded portion

What is claimed is:

1. A valve cover for a valve having a valve opening comprising:
    a cap including a top end and a side wall, the side wall being configured to cover an exterior portion of the valve and including a top edge that is coupled to a perimeter of the top end and a bottom edge that defines an opening of the cap;
    a plug disposed on an interior side of the top end of the cap, the plug projecting toward the opening of the cap;
    a plurality of flexible protrusions extending from an interior side of the side wall;
    a plurality of vents that extend along at least a portion of the top end of the cap;
    wherein the plug is configured to at least partially enter the valve opening of the valve, and the plurality of vents are configured to permit passage of gas from the valve opening when the valve cover is installed on the valve.

2. The valve cover of claim 1, wherein the plug includes a diameter that is substantially equal to the diameter of the valve opening.

3. The valve cover of claim 1, wherein a distal end of the plug is recessed with respect to the bottom edge of the side wall.

4. The valve cover of claim 3, wherein a height of the plug is about 25% to about 75% of a height of the side wall.

5. The valve cover of claim 1, further comprising a plurality of protrusions extending from an interior side of the side wall.

6. The valve cover of claim 5, wherein the plurality of protrusions extend toward the top end of the cap and can bend toward the side wall of the cap.

7. The valve cover of claim 6, wherein:
    the plurality of vents further extend in a longitudinal direction along the side wall of the cap.

8. The valve cover of claim 7, wherein each of the plurality of protrusions are located at a bottom end of the vents.

9. The valve cover of claim 1, further comprising at least one tear strip, the tear strip extending at least from the bottom edge of the side wall towards the top edge of the side wall.

10. The valve cover of claim 9, further comprising:
    a pull tab coupled to a portion of the bottom edge of the side wall located proximate the tear strip.

11. The valve cover of claim 10, wherein the pull tab extends from the bottom edge of the side wall.

12. The valve cover of claim 1, wherein the valve cover is made of thermoplastic resin.

* * * * *